UNITED STATES PATENT OFFICE.

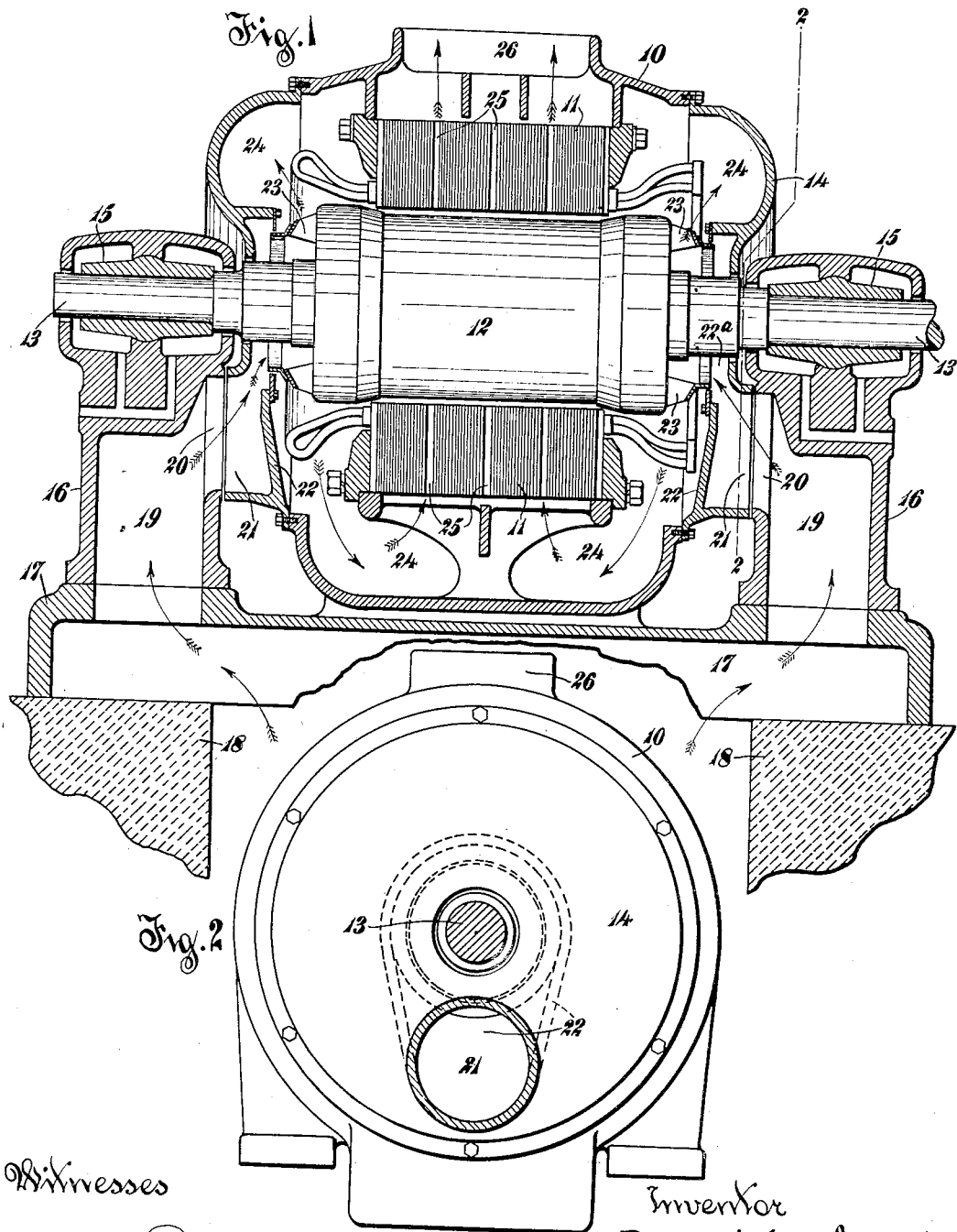

BERNARD A. BEHREND, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DYNAMO-ELECTRIC MACHINE.

No. 925,272.      Specification of Letters Patent.      Patented June 15, 1909.

Application filed May 27, 1907. Serial No. 375,812.

*To all whom it may concern:*

Be it known that I, BERNARD A. BEHREND, citizen of the United States, residing at Norwood, in the county of Hamilton and State of Ohio, have invented certain new and useful Improvements in Dynamo-Electric Machines, of which the following is a full, clear, and exact specification.

My invention relates to the ventilation of dynamo-electric machines.

Certain types of dynamo-electric machines require a forced circulation of air through and around them in order to dissipate the heat which is generated. In order to obtain this the dynamo-electric machines have often been inclosed in a housing and the circulation of air has been maintained by fans or blowers on the rotating element. The air from some suitable source has heretofore generally been led into the housing through admission chambers located at the ends of the housing and extending upward from the bottom thereof to the shaft. However, this location of the admission chambers has necessitated a great distance between the bearings, thus tending to decrease the rigidity of the rotating structure.

It is the object of my present invention to so arrange and combine the parts of a dynamo-electric machine and its housing that the space between the bearings formerly occupied by these admission chambers may be saved, thus allowing the bearings to be placed closer together.

A further object of my invention is to simplify the structure of the machine.

These objects are attained by leading the air from a suitable source through hollow pedestals supporting the bearings into the housing of the machine.

The novel features of my invention will appear from the description and drawings and will be particularly pointed out in the claims.

Figure 1 shows a vertical longitudinal section of a dynamo-electric machine embodying my invention; and Fig. 2 is a section on the line 2—2 of Fig. 1.

The main portion of the housing 10 supports the stationary element 11 of a dynamo-electric machine, here shown as a turbo-alternator. The rotating element 12 of this machine is mounted on a shaft 13 which extends through openings in the end walls 14 of the housing and is supported in bearings 15. These bearings are mounted in hollow pedestals 16, which together with the housing 10 are supported on a base 17, in turn resting on a foundation 18 of any desired character.

The passageways 19 formed in the pedestals 16 are connected to any suitable source of air supply preferably through conduits in the foundation 18. At their upper ends these passageways 19 communicate with lateral openings 20 which register with openings 21 in the walls of the housing. Partitions 22 guide the inflowing air upward to a chamber $22^a$ around the shaft 13 whence it is thrown outward by fans 23 into the chambers 24. From these latter chambers the air passes upwardly through the circumferential passages 25 in the stationary element 11 and around the periphery of the rotating element 12 to the opening 26 at the top of the housing, where it escapes. This circulation of air through the machine is maintained by the fans 23.

By utilizing the pedestals 16 as conduits for the inlet of air instead of having separate conduits for this purpose, it is possible to lessen the distance between the bearings 15, thus increasing the rigidity of the rotating structure, and also simplifying the structure, diminishing the cost, and improving the general appearance of the machine.

Many modifications can be made in the precise arrangements shown and described and all such which do not involve a departure from the spirit and scope of my invention I aim to cover in the following claims.

What I claim as new is:—

1. The combination in a dynamo-electric machine, of the fixed and movable elements of said machine, a housing therefor which supports one of said elements, and hollow pedestals supporting the other of said elements and serving as conduits through which air is admitted into said housing.

2. The combination in a dynamo-electric machine, of a housing supporting one element of said machine and provided with openings, bearings supporting the other element of said machine, and hollow pedestals supporting said bearings and provided with openings which register with the openings in the housing to allow air to be admitted into said housing through said pedestals.

3. The combination in a dynamo-electric machine, of the stationary and rotatable members of said machine, a housing supporting the stationary element and provided with openings, a shaft carrying the rotatable element, bearings for said shaft, hollow pedestals supporting said bearings and provided with openings which register with the openings in said housing, and means mounted on said shaft for causing the circulation of air through said pedestals and housing.

4. The combination in a dynamo-electric machine, of the relatively movable elements of said machine, a housing therefor, bearings for one of said elements, a hollow pedestal supporting one of said bearings and communicating with said housing, and means for causing the circulation of air through said pedestal and housing.

5. In a dynamo-electric machine, the combination of the fixed and movable elements thereof, an inclosing housing therefor, and means for supporting said movable element, said means including a hollow pedestal which serves as a conduit for conducting into said housing a fluid for cooling said members.

6. In a dynamo-electric machine, the combination of a housing, relatively movable members within said housing, a shaft for one of said members, bearings for said shaft, and a hollow pedestal supporting one of said bearings and also serving as a conduit for a fluid for cooling said members.

7. The combination in a dynamo-electric machine, of the fixed and movable elements of said machine, a housing for said machine, said housing being provided with inlet and outlet openings, bearings for said movable element, and hollow pedestals supporting said bearings and provided with openings which register with the inlet openings of the housing, and means for forcing air into said housing through said hollow pedestals and said inlet openings.

8. The combination in a dynamo-electric machine, of the fixed and movable elements of said machine, bearings for said movable element, hollow pedestals supporting said bearings and provided with openings, a housing for said machine, said housing being provided with inlet openings with which the openings in the pedestals register, and with an outlet opening at the top, and means for causing a flow of air through said hollow pedestals, inlet openings, housing, and outlet opening.

9. In a dynamo-electric machine, the combination of the relatively movable elements of said machine, a housing for said machine, said housing being provided with openings, bearings for one of said elements, hollow pedestals supporting said bearings and provided with openings which register with the openings in said housing, means for causing a flow of air through said pedestals, openings, and housing.

In testimony whereof I affix my signature, in the presence of two witnesses.

BERNARD A. BEHREND.

Witnesses:
  GEO. B. SCHLEY.
  FRED J. KINSEY.